July 27, 1965 H. V. LEWIS ETAL 3,196,722
PIPE CUTTER
Filed Feb. 21, 1964 5 Sheets-Sheet 1

INVENTORS.
Harold V. Lewis
Courtland C. Stanton
BY
ATTORNEY

INVENTORS.
Harold V. Lewis
Courtland C. Stanton
BY
ATTORNEY

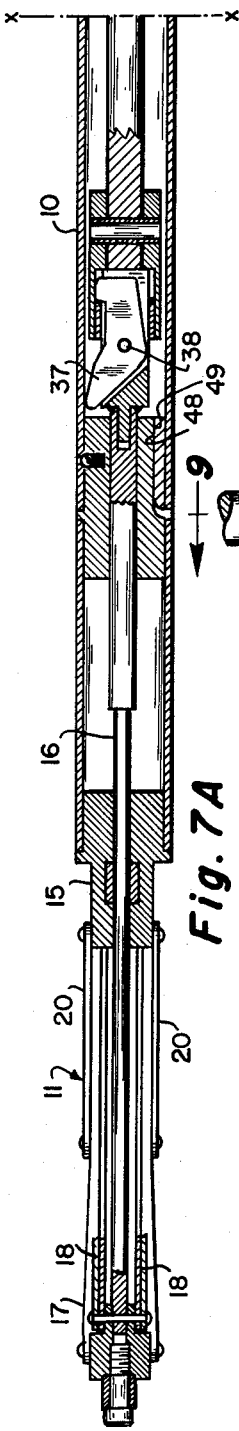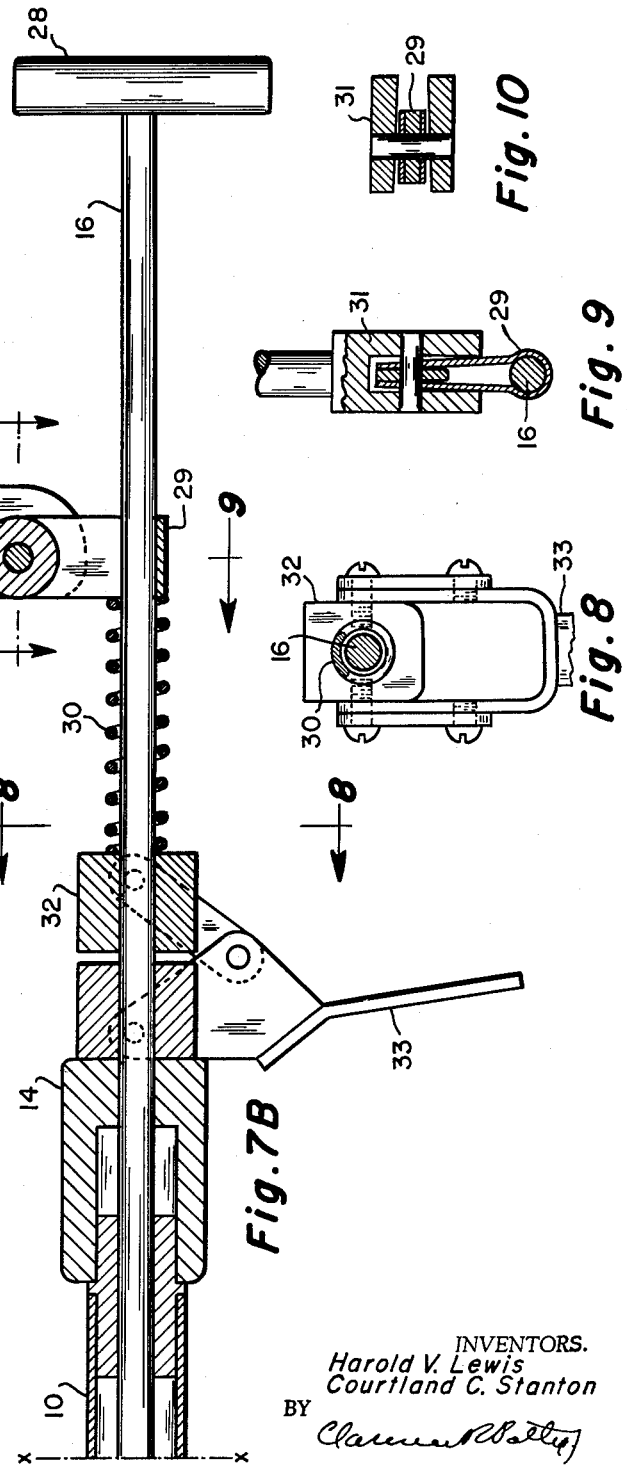

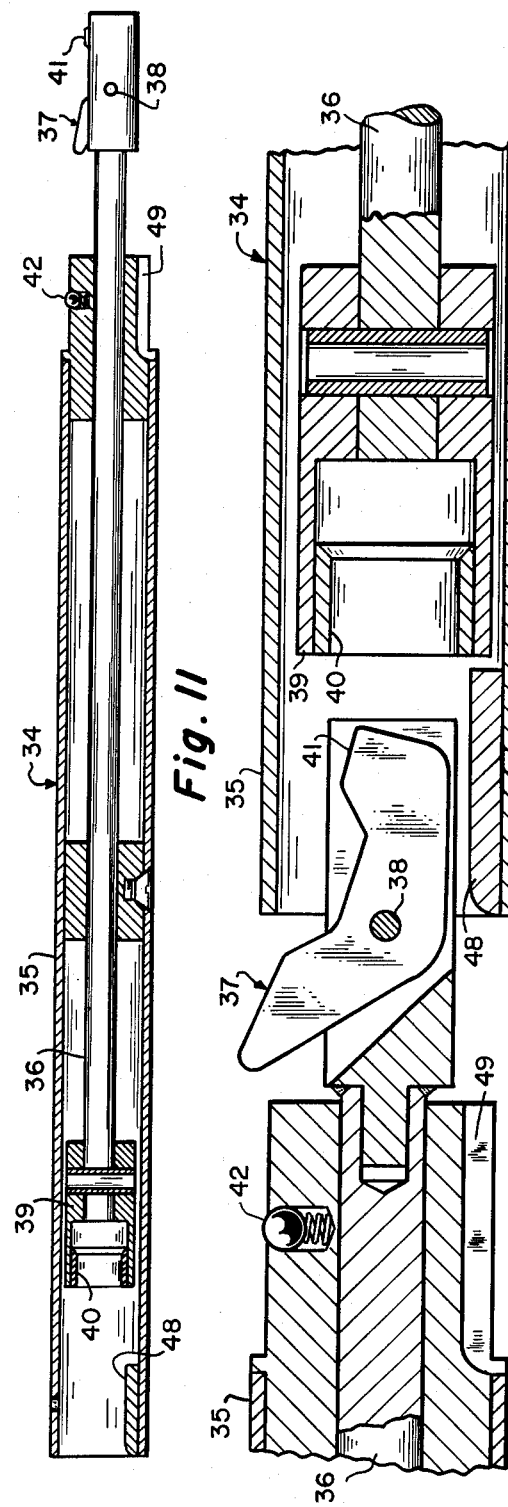
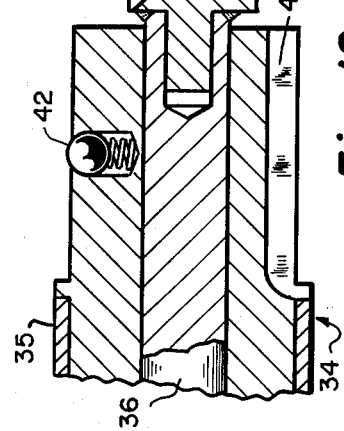
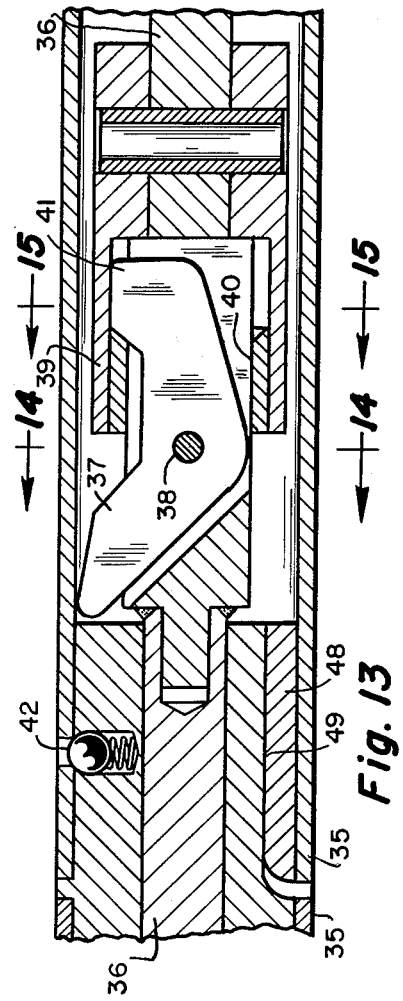
Fig. 11
Fig. 12
Fig. 13

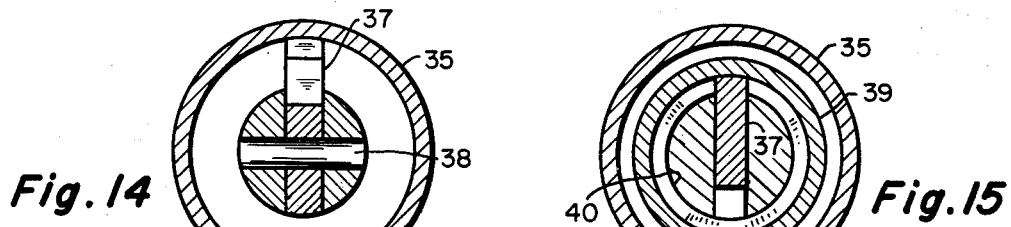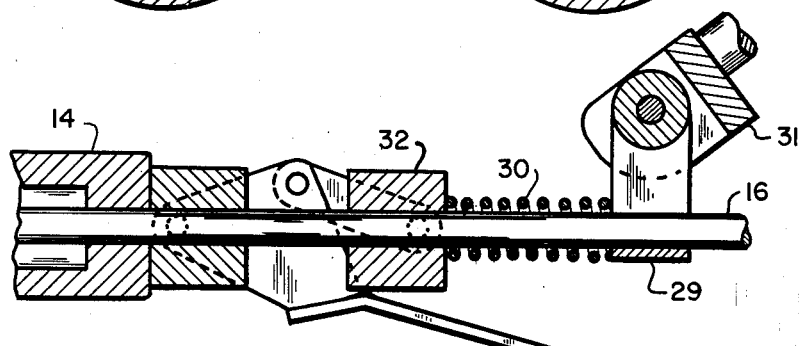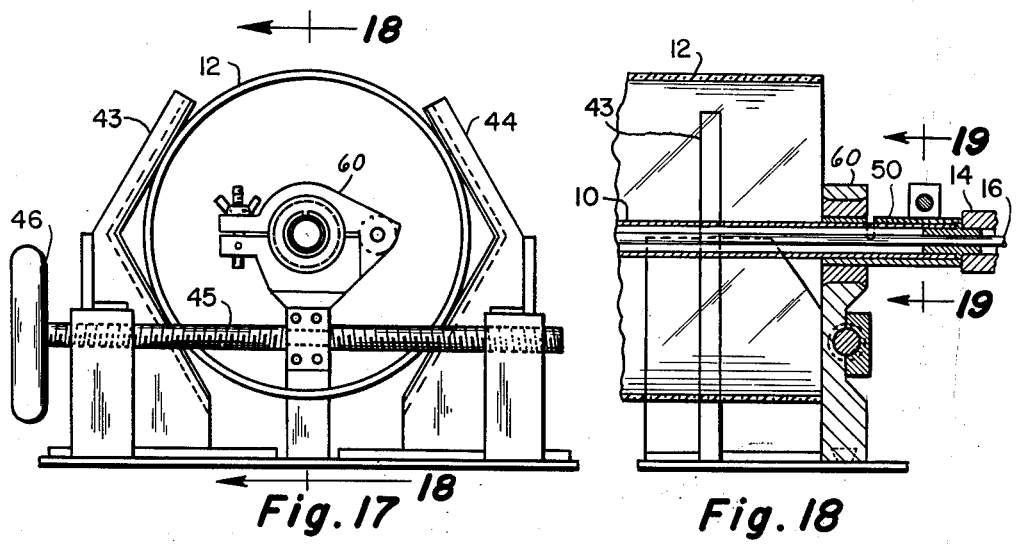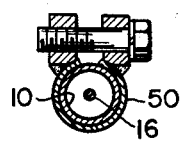

United States Patent Office 3,196,722
Patented July 27, 1965

3,196,722
PIPE CUTTER
Harold V. Lewis, Painted Post, and Courtland C. Stanton, Corning, N.Y., assignors to Corning Glass Works, Corning, N.Y., a corporation of New York
Filed Feb. 21, 1964, Ser. No. 346,515
5 Claims. (Cl. 83—12)

This invention relates to means for scoring the interior surfaces of glass pipe in preparation for the cutting thereof.

A standard method for cutting glass pipe involves cutting a circular score line around the interior surface of the pipe and subsequently subjecting the pipe to thermal shock in order to effect breakage along the score line. In order to cut such pipe at precise locations, it is necessary that the circular score line be both extremely uniform and very precisely located. Inasmuch as the interior score line in glass pipe is formed by a cutter carried on an expandable tool within the interior of the pipe, the quick and efficient formation of such score lines has been limited by mechanical limtiations in the apparatus previously employed.

The present invention has as an object the provision of apparatus whereby a cutter may be expeditiously applied to the inner surface of glass pipe at a precise location and with a precise and constant force.

Figure 1:
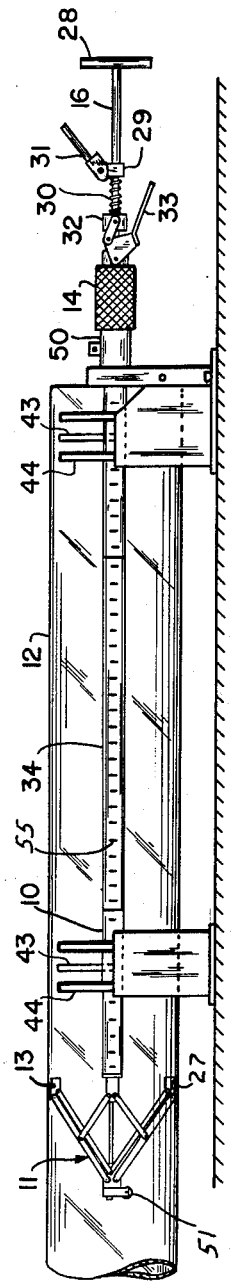
Figure 2:
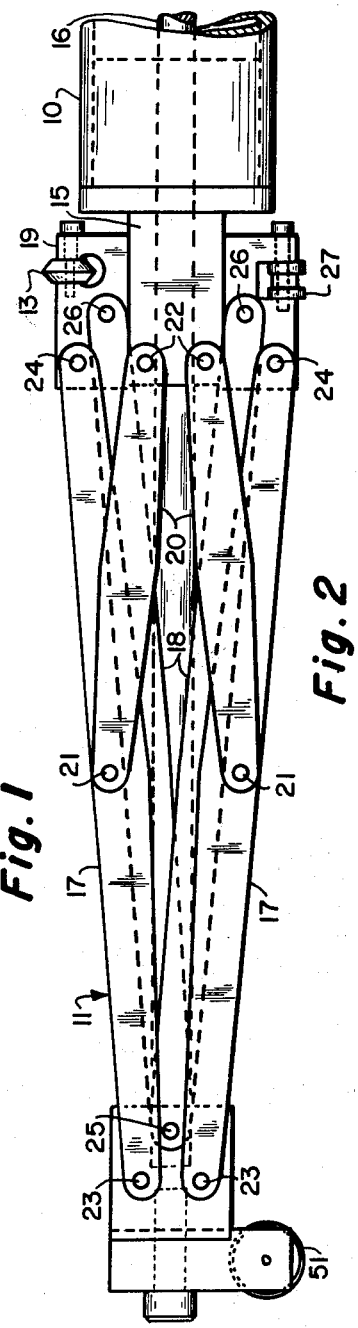
Figure 3:
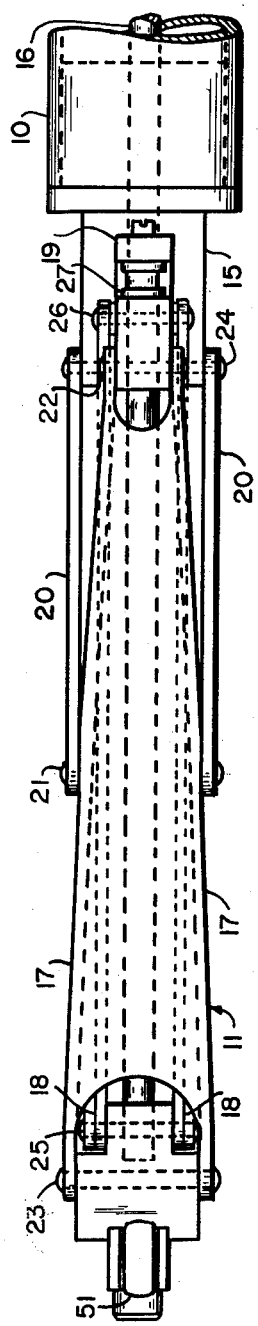
Figure 4:
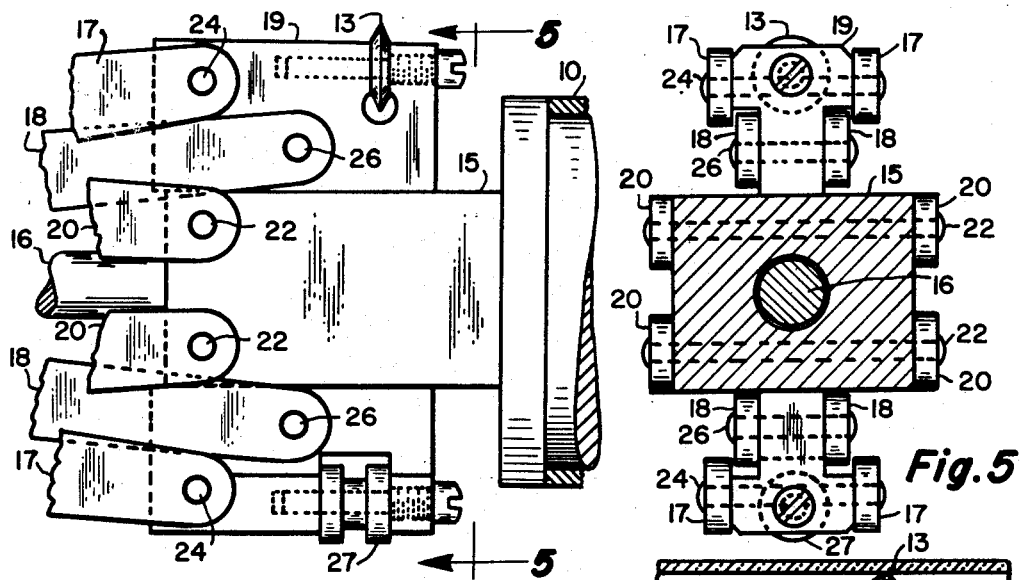
Figure 6:
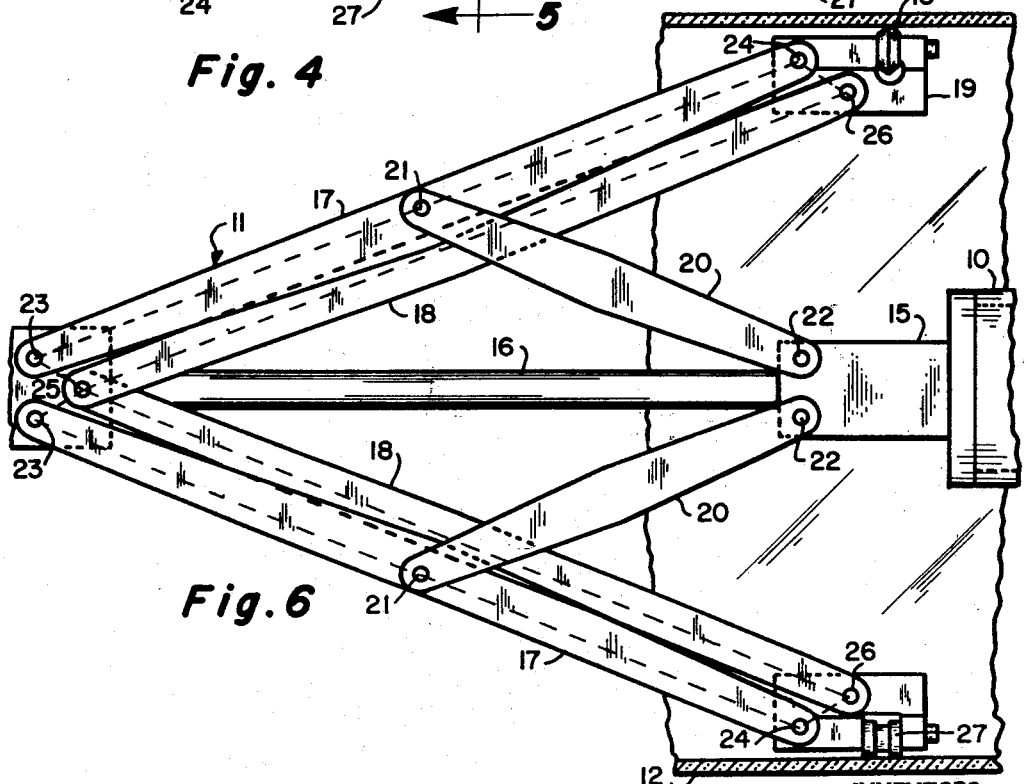

Such apparatus is illustrated in the accompanying drawing, in which:

FIGURE 1 is a side elevational view of pipe cutting apparatus according to the invention, FIGURE 2 is a side view of the expandable cutter head employed in the present apparatus prior to the expansion thereof, FIGURE 3 is a bottom view of the cutter head of FIGURE 2, FIGURE 4 is an enlarged view of a portion of FIGURE 2, FIGURE 5 is a sectional view taken on line 5—5 of FIGURE 4, FIGURE 6 is a view of the cutter head of FIGURE 2 in its expanded state, FIGURES 7A and 7B are sectional views showing the construction of the cutter arm and tensioning mechanism, the match line X—X indicating the relationship between the two figures, FIGURE 8 is a view taken on line 8—8 of FIGURE 7B, FIGURE 9 is a sectional view taken on line 9—9 of FIGURE 7B, FIGURE 10 is a sectional view taken on line 10—10 of FIGURE 7B, FIGURE 11 is an axial sectional view of a cutter arm extension, FIGURE 12 is an axial sectional view of a cutter arm extension linkage prior to the locking thereof, FIGURE 13 is a view similar to that of FIGURE 12, showing the linkage subsequent to the locking thereof, FIGURE 14 is a sectional view taken on line 14—14 of FIGURE 13, FIGURE 15 is a sectional view taken on line 15—15 of FIGURE 13, FIGURE 16 is an enlarged view of the tensioning means of the present apparatus, FIGURE 17 is an end view of the pipe cutting apparatus of the invention, FIGURE 18 is a sectional view taken on line 18—18 of FIGURE 17, and FIGURE 19 is a sectional view taken on line 19—19 of FIGURE 18.

Referring to the drawing, the present pipe cutting apparatus is illustrated generally in FIGURE 1 and comprises shaft 10 which carries cutter head 11. The cutter head is located within the bore of glass pipe section 12, and cutting tool 13 is caused to move along the interior surface of the pipe when the cutter head and shaft are rotated by means of handle 14.

The structure of cutter head 11 is illustrated in detail in FIGURES 2–6. The cutter head comprises a stationary support 15 mounted on the end of shaft 10. The cutter head is caused to expand and contract transversely between its closed position, illustrated in FIGURE 2, and its open position, illustrated in FIGURE 6, by the reciprocation of rod 16 in an axial direction through support 15. Two cutter supporting arms 17 and 18 are pivotally supported at one end of the enlarged tip of rod 16 and are similarly pivotally linked at their other ends to cutter support 19. Auxiliary support arm 20 is pivotally supported at one end on stationary support 15, while its remaining end is pivotally linked to cutter supporting arm 17. The distance between the axes of pivot pins 21 and 22 of auxiliary support arm 20 is exactly equal to the distance between the axes of pivot pins 21 and 23 of cutter supporting arm 17 and arms 17 and 20 form identical angles with rod 16. Pivot pins 23, 24, 25 and 26 form the corners of a parallelogram, illustrated by the broken lines of FIGURE 6, and the distance between the axes of pins 23 and 24 equals the distance between the axes of pins 25 and 26, and is exactly double the distance between the axes of pins 21 and 22. Thus, as rod 16 is drawn into stationary support 15, i.e., as rod 16 moves to the right in FIGURE 6, cutting tool 13 moves outward and upward from the closed position of FIGURE 2 to the open position illustrated in FIGURE 6. Due to the described construction of the cutter head, such motion is in a straight line perpendicular to rod 16. As rod 16 is moved to the left in FIGURE 6, cutting tool 13 will recede in the direction of support 15. Arm 20 may equally well be pivotally attached to arm 18, in which case pin 21 will be midway between pins 25 and 26.

Due to the fact that cutter head 11 is symmetric about the axis of rod 16, corresponding parts on each side of the line of symmetry are indicated by corresponding reference numerals. As cutting tool 13 moves, roller 27 moves simultaneously along the same straight line as cutting tool 13 but in an opposite direction. Thus, cutting tool 13 is pressed against the interior surface of pipe section 12. Roller 51, illustrated in FIGURE 2, is provided in order to facilitate insertion of the cutter head into the pipe in its closed position without accidental scratching of the bottom of the inner surface of the pipe.

Due to the described cutter head construction, the distance of cutting tool 13 from the end of pipe section 12 can be determined by means of scale 55 marked on shaft 10. Because the cutting tool moves in a line perpendicular to rod 16, the distance between it and the pipe end will not change as the cutter head moves transversely.

A straight line through the axes of pins 24 and 26 will always be parallel to a straight line through pins 23 and 25. Thus, cutting tool support 19 will not rotate as it moves outwardly toward the pipe surface but will maintain the cutting tool with its edge oriented toward the pipe surface. If the precise orientation of either cutting tool 13 or roller 27 with respect to the pipe surface is not critical, such parts may be attached directly to the respective support arms 17. In such case, support arms 18, which function in the illustrated embodiment to maintain the angular orientation of the cutting tool and roller, will be unnecessary and cutting tool 13 and roller 27 will be placed at the locations of pivots 24.

The manner in which rod 16 is reciprocated within stationary support 15 and shaft 10, and the manner in which the cutter head is rotated, can be seen from examination of FIGURES 7A and 7B. Since handle 14, shaft 10 and support 15 are rigidly fixed to one another, and since rod 16 is carried within shaft 10, when handle 14 is turned, the entire assembly illustrated in FIGURES 7A and 7B will rotate.

Expansion of cutter head 11 is effected by moving rod 16, by means of handle 28, in the right-hand direction in FIGURE 7B. During operation of the device, handle 28 is withdrawn until both cutting tool 13 and roller 27 contact the inner surface of pipe section 12. At this point, the constant tensioning means of the present invention is utilized. After the cutting tool and the roller have contacted the inside of the glass pipe, with sleeve 32 in the position illustrated in FIGURE 7B, sleeve 29 is moved in the direction of spring 30 until it contacts the spring, without placing the spring in compression. Sleeve 29 is then tightened about rod 16 by the wedge action of clip 31, illustrated in detail in FIGURES 9 and 10. Next, sleeve 32 is caused to move in the direction of sleeve 29 by the action of handle 33 to the position illustrated in FIGURE 16. Movement of sleeve 32 to the left in FIGURE 16 is prevented by the fact that the handle bears against the bottom of sleeve 32. In this position, spring 30 has been compressed, and, due to the fact that one end of the spring bears upon sleeve 29, which is now fixed to rod 16, the spring exerts a constant force tending to move rod 16 in the right-hand direction in the drawing. This constant force is transmitted to the cutter head, and cutting tool 13 is urged against the inner surface of pipe section 12 by a constant force. Thus, there is no danger neither of applying too great a force to the cutting tool and thereby cracking the pipe nor of applying too little force to the cutting tool and consequently effecting inadequate scoring of the pipe surface.

When the present pipe cutter is to be used in scoring pipe sections of varying length, any number of extensions 34, of the type illustrated in FIGURE 11, may be interposed in the cutting apparatus illustrated in FIGURES 7A and 7B. As illustrated in FIGURES 11 through 15, an extension means 34 comprises generally a hollow outer shaft 35 and an inner rod 36. When extension means 34 is incorporated into the pipe cutter, as illustrated in FIGURE 1, its outer shaft 35 becomes a segment of the cutting apparatus outer shaft 10, and its rod 36 becomes a segment of rod 16.

The linkage between two extensions or between an extension and the remainder of the cutting apparatus is illustrated in FIGURES 12–15. Rod 36 is axially reciprocable within outer shaft 35. One end of rod 36 is provided with locking lever 37, which is pivoted to the rod by means of pin 38. The remaining end of rod 36 is provided with a hollow portion 39 having located in the vicinity of its end a barrier 40. As one extension means is inserted into another, lug 41 of locking lever 37 passes within hollow end portion 39 of rod 36. The action of shaft 35 upon the end of the locking lever on the opposite side of pin 38 from lug 41 effects rotation of the locking lever, thereby placing lug 41 within the cavity behind barrier 40. As long as locking lever 37 is within hollow shaft 35, i.e., as long as the respective shafts 35 are held together by means of spring loaded ball 42, lug 41 remains wedged within the cavity in hollow end portion 39 of rod 36. Thus, when one rod 36 is axially reciprocated, the remaining rod 36 linked thereto will also be axially reciprocated, thereby permitting opening and closing of the cutter head by means of the continuous rod 16 which is made up of rod segments 36. Each extension 34 is provided at one end with a key 48 and at its other end with a keyway 49 so that when two extensions are linked together, as in FIGURE 13, rotation of shaft 35 of one extension will cause rotation of the other extension.

As illustrated in FIGURES 17–19, shaft 10 is tightly held in sleeve 50, which rotates within clamp 60, while pipe section 12 is held by means of clamps 43 and 44. Clamps 43 and 44 are movable on threaded shaft 45, which is in turn actuated by handle 46.

Inasmuch as the above description has been given solely as that of a preferred embodiment of the present invention, it is intended that the scope of the invention be limited only by the scope of the appended claims.

We claim:
1. Means for circumferentially scoring the interior surface of glass pipe which means comprises a hollow support, a rod passing through said hollow support and extending therefrom and axially reciprocable with respect thereto, at least one first support arm attached to a pivot near one end of said rod outside said hollow support and attached at its remaining end to a cutting tool, a second arm attached at one end to a pivot on said hollow support and at its remaining end to a pivot on said first support arm midway between said cutting tool and said pivot to which said first arm is attached, and on the side of said rod opposite said cutting tool at least one third support arm attached to a pivot near one end of said rod outside said hollow support, a fourth arm attached at one end to a pivot on said hollow support and at its remaining end to a pivot on said third support arm midway between said pivot to which said third support arm is attached and the remaining end of said third support arm, means for rotating said rod and said hollow support and means for reciprocating said rod with respect to said hollow support.

2. Means according to claim 1 in which said hollow support comprises a hollow shaft surrounding said rod, said rod having a portion extending beyond said hollow shaft at its end opposite said cutting tool, first means movable along said portion of said rod, means for clamping said first means in fixed positions along said portion of said rod, a spring surrounding at least a part of said portion of said rod between said first means and said cutting tool, second means movable along said part of said portion of said rod, means for reciprocating said second means a predetermined distance along said part of said portion of said rod, and means for transmitting to said hollow shaft axial forces applied to said second means, said spring being located between said first and second means and being compressible therebetween by movement of said second means.

3. Apparatus for circumferentially scoring the interior surface of glass pipe which comprises an expandable cutter head carrying a cutting tool, said cutter head comprising a first portion attached to a rod reciprocable within a shaft and a second portion attached to said shaft, said cutter head being expandable and contractable by reciprocation of said rod with respect to said shaft, said rod having a portion extending beyond said shaft at its end opposite said cutter head, first means movable along said portion of said rod, means for clamping said first means in fixed positions along said portion of said rod, a spring surrounding a part of said portion of said rod between said first means and said cutter head, second means movable along said part of said portion of said rod and means for reciprocating said second means a predetermined distance with respect to said shaft along said part of said portion of said rod, said spring being located between said first and second means and being compressible therebetween by movement of said second means, means for rotating said rod and said hollow support and means for transmitting to said shaft axial forces applied to said second means.

4. Means for circumferentially scoring the interior surface of glass pipe which comprises a hollow support, a rod passing through said hollow support and extending therefrom and axially reciprocable with respect thereto, first and second support arms attached to pivots near one end of said rod outside said hollow support and attached at their remaining ends to pivots on a cutting means, said pivots forming the points of intersection of the sides of a parallelogram, a third arm attached at one end to a pivot on said hollow support and attached at its remaining end to a pivot on one of said first and second support arms midway between the first-mentioned pivots on said arm, the distance between the axes of said pivots at the ends of said third arm being one-half the distance between the axes of said pivots on the ends of the respective said first and second arms, and on the side of said rod opposite said cutting means fourth and fifth support arms attached to pivots near one end of said rod outside said hollow support and attached at their remaining ends to pivots on means supporting a roller, said pivots forming the points of intersection of the sides of a parallelogram, and a sixth arm attached at one end to a pivot on said hollow support and at its remaining end to a pivot on one of said fourth and fifth support arms midway between the two first-mentioned pivots on said arm, the distance between the axes of said pivots at the ends of said sixth arm being one-half the distance between the axes of said pivots at the ends of the respective said fourth and fifth arms, means for rotating said rod and said hollow support and means for reciprocating said rod with respect to said hollow support.

5. Means according to claim 4 in which said support comprises a hollow shaft surrounding said rod, said rod having a portion extending beyond said hollow shaft at its end opposite said cutting means, a first collar movable along said portion of said rod, means for clamping said collar in fixed position along said portion of said rod, a spring surrounding a part of said portion of said rod between said first collar and said cutting means, a second collar movable along said part of said portion of said rod and means for reciprocating said second collar through a fixed distance with respect to said shaft along said part of said portion of said rod, said spring being located between said collars and being compressible therebetween by movement of said second collar and means for transmitting to said hollow shaft axial forces applied to said second collar.

References Cited by the Examiner
UNITED STATES PATENTS

| | | | |
|---|---|---|---|
| 672,312 | 4/01 | Cook | 30—164.9 X |
| 996,385 | 6/11 | Wilkins | 30—164.95 X |
| 1,024,983 | 4/12 | Frink | 83—12 |
| 1,088,135 | 2/14 | Fagan | 82—82 |
| 2,622,327 | 12/52 | Halonen | 33—21 |
| 2,884,066 | 4/59 | Teplitz et al. | 83—180 X |

ANDREW R. JUHASZ, *Primary Examiner.*
LEON PEAR, *Examiner.*